June 4, 1963 F. W. A. WARD 3,092,534
APPARATUS FOR APPLYING ADHESIVE TAPE
Filed June 6, 1960 3 Sheets-Sheet 1
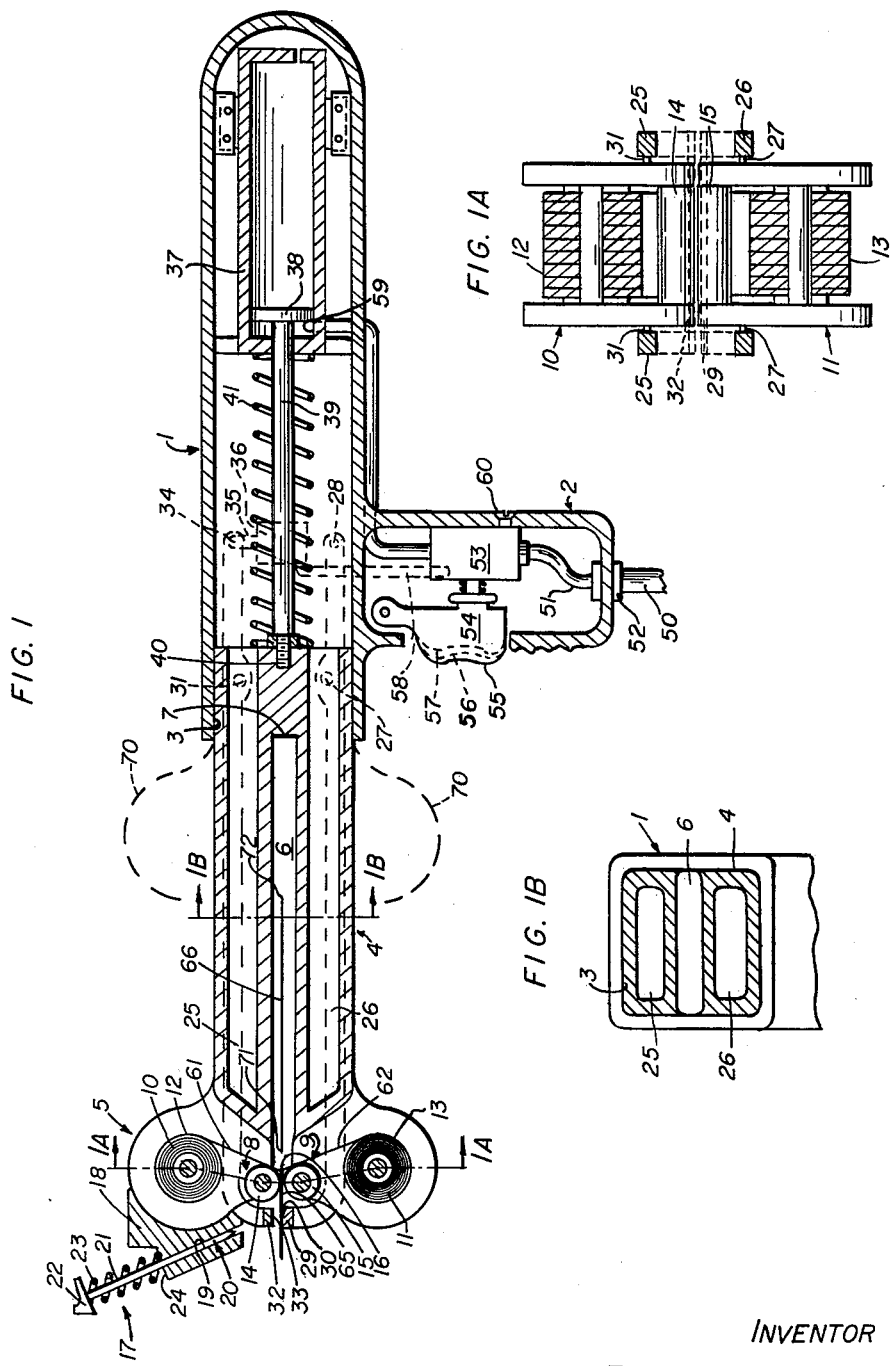
INVENTOR
FREDERICK W. A. WARD
BY— Smart & Biggar,
ATTORNEYS June 4, 1963  F. W. A. WARD  3,092,534
APPARATUS FOR APPLYING ADHESIVE TAPE
Filed June 6, 1960  3 Sheets-Sheet 2
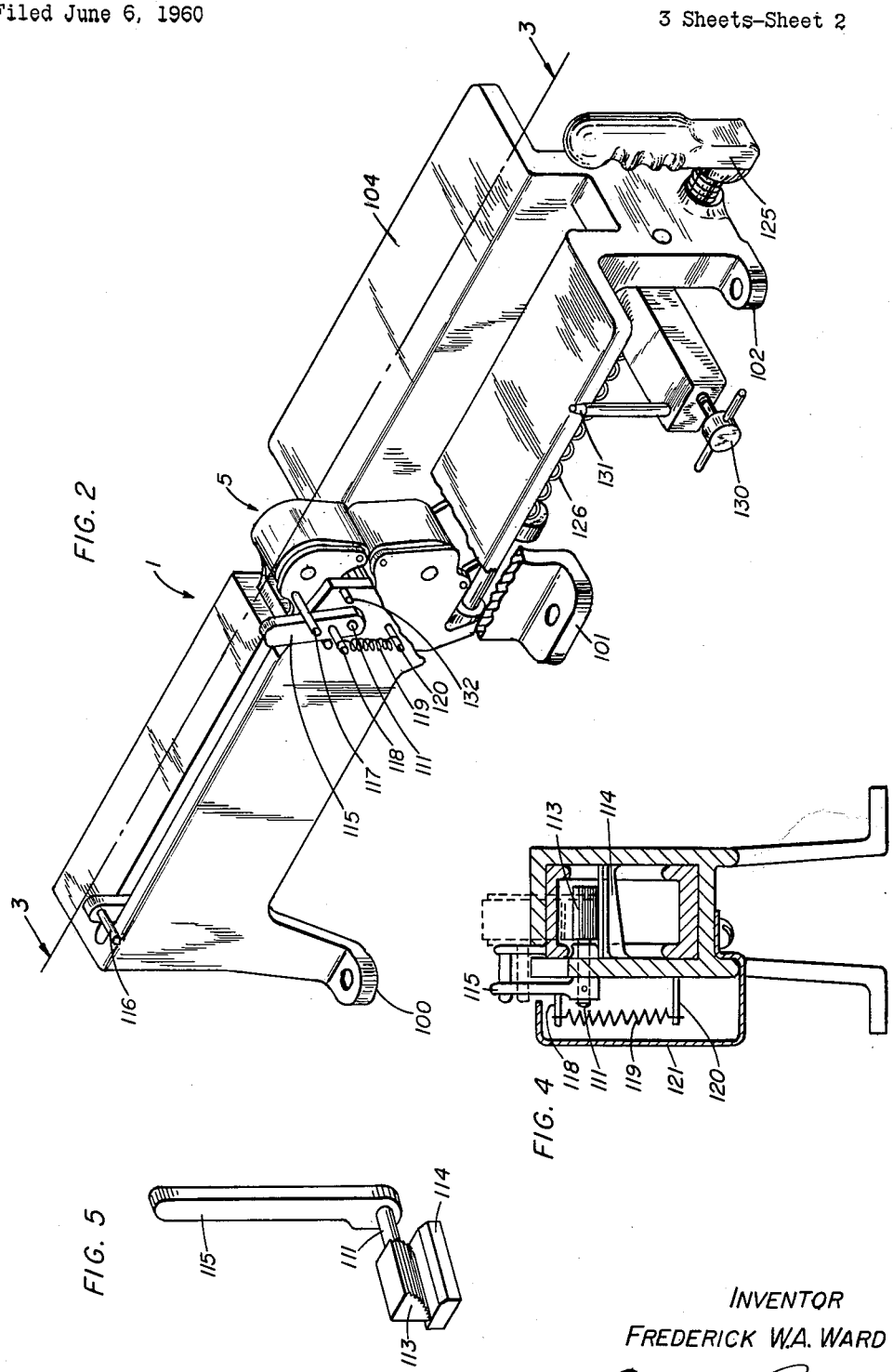
INVENTOR
FREDERICK W.A. WARD
BY— *Smart & Biggar*
ATTORNEYS.

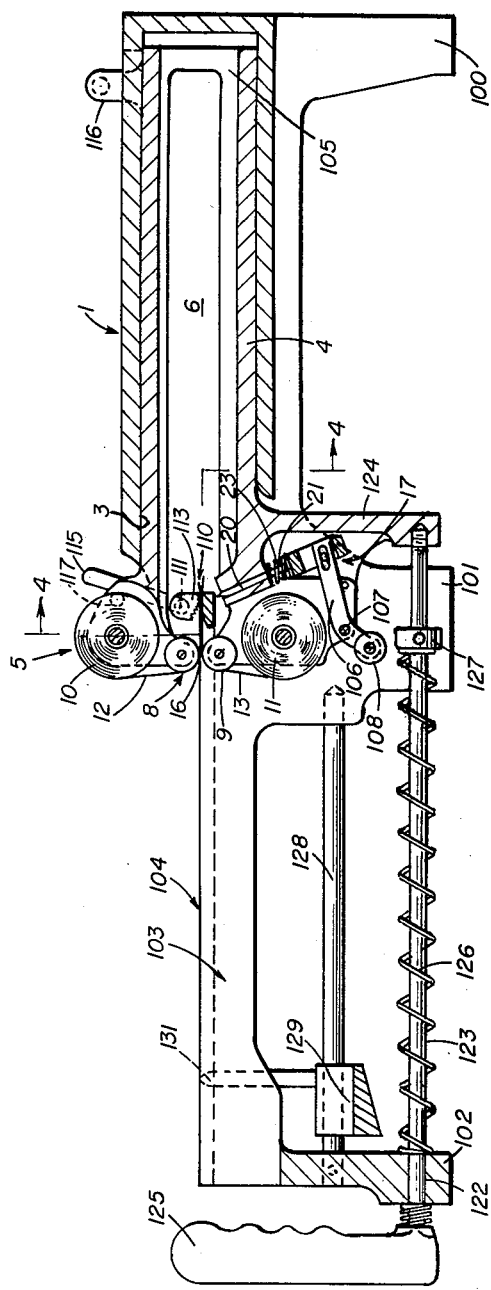

United States Patent Office 3,092,534
Patented June 4, 1963

3,092,534
APPARATUS FOR APPLYING ADHESIVE TAPE
Frederick William Alan Ward, Hamilton, Ontario, Canada, assignor to Steel Company of Canada Limited, Hamilton, Ontario, Canada
Filed June 6, 1960, Ser. No. 34,047
6 Claims. (Cl. 156—505)

This invention relates to a method and apparatus for applying a strip of adhesive tape to one or both surfaces of one or more pieces of sheet material.

Operations of this type would, for example, be required when it is necessary to splice together two or more pieces of relatively thin material, or to cover the edge of a piece of thin material in order to afford protection or stiffening to the edge itself. Other applications of the invention would be the sealing of bags made from thin material such as paper, fabric, or polyethylene. Finally, there are many instances where it is desirable to be able to effect a spliced joint in a continuously produced ribbon or strip and the present invention affords a convenient method and apparatus for doing the same.

In prior application Serial No. 826,875, filed July 13, 1959, in the names of M. V. Swick, James Douglas and myself, a method and apparatus is disclosed and claimed for effecting a taped spliced joint in a continuously produced strip, such as, for example, as is produced by a tin line. With the apparatus therein shown, however, the material being spliced must itself have a rigidity sufficient to cause the upper and lower tapes, which affect the spliced joint, to "roll-off" from the supply spools as the tape applicator means traverses the region of the joint. While this requirement does not affect the usefulness of machines made in accordance with this prior invention when they are employed to make spliced joints on conventional gauges of tin plate, it does affect applicability of the invention to materials of low inherent rigidity, such as example paper or thin plastic sheeting. I have found, however, that by modification and addition to the basic arrangement disclosed and claimed in the aforesaid prior application, it is possible to produce a taping mechanism which is useful on virtually any type of sheet material, regardless of its inherent rigidity.

In accordance with my new method I include the step of clamping, and thereby maintaining in fixed position, the joined together free ends of the strips of tape extending out of the exit faces of the tape applicator means so that the force necessary to cause the tapes to be pulled from the supply sources and be applied evenly on the piece of sheet material is transmitted to the clamping means by the tapes themselves so that no shearing or buckling stresss is imposed upon the piece of sheet material.

The invention will now be explained in connection with the attached figures of drawings wherein:

FIGURE 1 is a side elevational view in section of an embodiment of the invention in the form of a "gun" which is particularly useful where portability is a desired characteristic;

FIGURES 1A and 1B are cross-sectional views taken along the lines 1A—1A and 1B—1B respectively, of FIGURE 1;

FIGURE 2 is an isometric view of another embodiment of the invention having a taping table, the embodiment in question being manually operated;

FIGURE 3 is a side view, in section, taken along line 3—3 of FIGURE 2;

FIGURE 4 is a cross sectional view taken along line 4—4 of FIGURE 3 wherein, for the purposes of clarity, the taping head is shown in phantom and, FIGURE 5 is a diagrammatic view useful in explaining operation of the clamp for the joined together tape ends.

Referring now to FIGURE 1, the taping device is provided with a body member 1 having a downwardly extending handle 2 so as to form generally the shape of a "gun." In the view shown, the left end of the body member 1 is provided with a cylindrical opening 3 into which fits a U-shaped member generally indicated at 4. The U-shaped member 4 is in turn provided at its open end with a taping head mechanism generally indicated at 5. The body portion of the U-shaped member 4 is generally cylindrical in shape and is adapted to have sliding engagement with the opening 3 of the body member 1. The slot 6 of the U-shaped member 4 extends from the extreme left end to a location 7 near the base thereof.

The taping head 5 comprises upper and lower tape applicator means 8 and 9, and corresponding tape supply sources 10 and 11 which in this case are spools of tape 12 and 13. The tape applicator means in the embodiment shown comprise rollers 14 and 15 journalled on the upper and lower parts of the U-shaped member, at the extreme left end thereof. The rollers 14, 15, by any suitable means not shown, are yieldably urged together so as to form a bite 16 as shown. When ready for operation, upper and lower tapes 12 and 13 are fed from the upper and lower tape supply sources 10 and 11 so that they extend towards each other, across the entry faces of the tape applicator means 8 and 9, between the bite 16 and thence outwardly, past the exit faces of the tape applicator means 8 and 9. As can be seen, the bite 16 is located in line with the slot 6 of the U-shaped member.

In the embodiment shown, the taping head 5 is also provided with a manually operated shear generally represented at 17 comprising a housing 18 attached to the upper portion of the U-shaped member 4, said housing having a slot 19 adapted to accommodate a shear blade 20 which is in turn attached at its upper end to a shaft 21 as shown. The upper end of the shaft 21 provided with a thumb key 22 to facilitate operation of the shear. A coil spring 23 surrounds the shaft 21 and is compressed between the under surface of the thumb key 22 and the upper surface 24 of the housing as the shear is depressed, so as to provide an automatic return when the pressure is released. By some suitable means not shown the upward travel of the shear is stopped at a convenient location so as to prevent disengagement of the shear with the housing.

On each side of the device illustrated in FIGURE 1 and more specifically shown in FIGURES 1A and 1B there are provided upper and lower clamp arms, of which only one pair of upper and lower arms 25 and 26 are shown, these being located on the "far side" of the gun. The two lower clamp arms 26 are permanently attached as at 27 and 28 to the body member 1. Extending between them and rigidly attached thereto, is a lower clamping plate 29 having a tapered upper surface 30 generally in line with the slot 6. The pair of upper arms 25 are pivoted as at 31, and have extending between them and rigidly attached thereto an upper clamping plate 32 having a serrated lower surface 33. The other ends of the upper arms 25 are connected as at 34 by means of shaft 35 to an air cylinder 36 located on each side of the body member 1.

Within the right end of the body member 1 there is located a cylinder 37 adapted to accommodate a piston 38 to which is in turn attached a shaft 39 connected at its other end to the base of the U-shaped member 4, as shown at 40. Surrounding the shaft 39 is a compression spring 41 which is adapted to return the U-shaped member to its "outer" position shown in the drawings as a result of movement of the piston 38 towards the right end of the cylinder 37.

An external pneumatic supply is connected by means of conduits 50, 51 and intermediate connector 52 to the control valve 53 mounted within the handle 2. The control valve is actuated by a trigger 54 having three positions 55, 56, 57, the drawing showing the trigger in the first position 55, the others being shown in phantom. At position 55, the gun is disconnected from the external pneumatic supply so that, accordingly, the clamps 29, 32 are open and the U-shaped member is in "out" position as shown. At position 56, pressure is applied to cylinder 36 by conduit 53, so as to close the clamps 29, 32. In the third position 57 pressure is maintained in cylinder 36, and is also applied to the inlet port 59 of cylinder 37 so as to move piston 38 and therefore U-shaped member 4 to the right to effect a taping stroke. The control valve 54 is also provided with an adjustable bleed off screw 60 which, as will be explained below, facilitates adjustment of the return stroke after taping.

Before commencing taping operations the tape supply sources 10, 11 comprising reels of tape 12 and 13 are inserted in the housings provided therefor, and the strips of tape 61, 62 are threaded between the tape applicator means 8 and 9 so as to form the bite 16 as explained above. If it is desired to place adhesive tape on only one side of the sheet material being spliced, only one of the tape supply spools 12 or 13 needs to be of the adhesive variety; the other may be a plain non-adhesive tape which is used for control purposes only. If however adhesive tape is to be applied to both pieces of the sheet material, both tapes 12 and 13 will be adhesive. Whichever arrangement is used, the adhesive surface of the tape or tapes must face the opposite tape so that the tapes adhere together in the bite and a length of joined together tapes 65 extends leftwardly from the exit faces of the tape applicator means 8 and 9. Assuming that a continuously produced strip of sheet material has become broken, and it is desired to splice the severed ends together in situ, the two ends would be fed into the slot 6 of the U-shaped member and held substantially in registry with one another in line with and close to the bite 16, as shown by line 66. Upon depression of the trigger 54 to the second position 56, air pressure is introduced into the cylinder 36 (and of course its counterpart on the near side of the gun, which actuates the upper clamp arm on that side) which in turn cause actuation of the upper clamp arms so that the clamping plate 32 moves downwardly, and together with the lower clamping plate 29, jams tightly the joined together free ends 65 of the tapes 12, 13. Upon further depression of the trigger 54, air pressure is introduced into the left end of the cylinder 37, causing the piston 38 to move to the right, thereby moving the U-shaped member in the same direction so that the taping head 5 eventually attains the position shown by the phantom lines 70. As this movement proceeds, the bite 16 moves to the right and engages with the edge 71 of the pieces which are to be taped. The tape applicator means 8, 9 spread apart slightly to accommodate the thickness of the pieces being taped and the tapes 12 and 13 are "rolled on" as the travel of the U-shaped member 4 with the taping head 5, proceeds away from the clamps. The force required to unroll and evenly apply the tapes 12 and 13 from the supply sources 10 and 11 is provided by the tapes 12 and 13 themselves. These tapes in turn transmit the force to the clamps. The result is that no shearing or tearing force is imposed upon the sheet being taped, and a smooth uniform joint is obtained. Movement of the tape applicator means 8 and 9 continues until the bite 16 has passed the other edge 72 of the material being taped whereupon the tapes 12 and 13 are once again joined directly and a length of joined together tapes once again issues out of the bite 16 and extends past the exit faces of the tape applicator means 8, 9. At the end of the travel, the tape shear 17 is actuated so as to sever the tapes, leaving a short length of joined together tapes ready to be gripped by the clamps at the beginning of the next operation. The operator then releases the trigger 54 which in turn causes immediate release of the clamps and a controlled return of the U-shaped member to its original position, the speed of the return being controlled by the bleed-off screw 60 as referred to above. The force actuating the return is of course provided by the spring 41 which is compressed when the piston 38 is at the right end of the cylinder 37. When the U-shaped member 4 has returned to its original "out" position, the joined together ends 65 will be located between the clamping plates 29, 32, ready to be engaged by them when a further taping operation is to be effected.

When the splicing operation is complete it will be appreciated that the whole mechanism will be completely to one side of the piece or pieces of sheet material being taped. While this is not of great importance so far as relatively short lengths of material are concerned, which in any event could be removed from the slot 6 by motion transverse to the gun, it is necessary for satisfactory operation in connection with continuous strips.

Referring now to the embodiment illustrated in the remaining FIGURES 2 to 5 inclusive, the taping device there is provided with a body member 1 in the form of a stand having legs 100, 101 and 102 adapted to be attached to some rigid support, and providing a flat surface or table upon which the pieces of sheet material to be taped can conveniently be rested during the taping operation. In the embodiment shown in the figures, the right end of the device comprises a cylindrical opening 3 adapted to accommodate the shank portion of a U-shaped member 4. On the left end of the U-shaped member is located a taping head generally indicated at 5 having tape applicator means 8 and 9 and tape supply sources 10 and 11 similar to those discussed in connection with FIGURE 1. A bite 16 formed by the tape applicator means 8 and 9 is, as before, aligned with the slot 6 of the U-shaped member 4. The surface 104 of the table 103 is arranged so that it is substantially in line with the bite 16 as shown. It may be noted that in this case, the tapes 12 and 13 (one or both of which may be adhesive) are fed around the tape applicator means 8, 9 in a direction opposite to that shown in the embodiment of FIGURE 1, with the result that the bite 16 and the entry faces of the tape applicator means face away from the base 105 of the U-shaped member 4, contrary to the arrangement shown in FIGURE 1. As before, a tape shear means generally indicated at 17 is provided on the taping head 5, in this case being connected to the lower side of the U-shaped member 4. The shear means comprises a shear blade 20 connected to a shaft 21 the upper end of which is pivotally connected to an arm 106 which is in turn pivoted on body member 1 at 107. The other end of the arm 106 is provided with a cam follower roller 108 having a function which will be described below. A spring 23 is arranged about the shaft 21 so as to provide an automatic withdrawal of the blade 20 after it has served its function.

As best shown in FIGURES 4 and 5 a toggle actuated clamp generally indicated as 110 is mounted on the body member 1 about the centre thereof. The clamp comprises a shaft 111 extending through a boss 112 on the inside of the body member 1, the end of the inside shaft, the body member being provided with a cam type clamp 113 having a serrated surface and adapted, when rotated, to give a tight gripping engagement with the anvil 114. The outer end of the shaft is provided with an arm 115 the upper end of which is adapted to be moved by trips 116 and 117, as will be described in detail below. There is also mounted on the arm 115 a boss 118 from which a coil spring 119 extends to a stationary boss 120 on the body member 1. This spring provides a rapid clamp and release action as the arm passes through "top-dead-centre"

of the spring-arm axis. Finally, as shown in FIGURE 4 only, a cover plate 121 can be provided to give mechanical protection to the toggle assembly.

The front foot 102 of the body member 1 is provided with a bore 122 through which extends a shaft 123 connected at one end to a downwardly extending arm 124 which may be integral with the U-shaped member 4, and connected at the other end to a handle 125. A spring 126 is disposed about the shaft 123 to the right of the front: an adjustable stop 127 being mounted on the shaft 123 to permit adjustment of the spring tension.

Disposed above the shaft 123 and on each side thereof are further shafts 128 (only one being shown) extending between the legs 101 and 102, and upon which there is arranged, in adjustable fashion, a tapered cam 129 bridging the shafts 128 and adapted to engage with the cam follower roller 108 discussed above. The position of tapered cam 129 is adjustable along shafts 128 and is provided with an adjustment screw 130 to permits fixation at any given position, the position being indicated by the pointer 131 which extends upwardly to the surface of the table.

The operation of this device is as follows. Assuming that the tapes 12 and 13 have been threaded from the supply rolls 10 and 11 around the entry faces of the tape applicator means 8 and 9, and that the joined together length of tape 65 is rigidly gripped between the clamp 113 and the anvil 114, the piece or pieces of sheet material to be taped are arranged on the table 103 so that the region in which the tape is to be applied is substantially in registry with and immediately adjacent to the bite 16. The handle 125 is then pulled outwardly so as to move the U-shaped member 4 in the same direction, thereby advancing the bite 16 between the entry faces of the tape applicator means 8 and 9 so that it comes into engagement with the edge of the piece or pieces of sheet material to be taped, and thereafter the tape applicator means opens slightly so that they traverse the upper and lower surfaces of the sheet material, applying a strip of adhesive tape on one or both sides as the case may be. Movement of the handle 125 continues until the bite 16 has passed the other edge of the sheet material and the strips of tape 12 and 13 are once again in direct contact with each other. The movement continues until the cam follower roller 108 has been forced downwardly enough by the tapered surface of cam 129 that the blade 20 has advanced upwardly so as to sever the joined together pieces of tape which have been produced in the region between the exit faces of the tape applicator means and sheet being taped. Because the tape is held taut between the clamp and the applicators, the shearing load is not transmitted to the pieces being taped. At this point trip 116 attached to the U-shaped member near the base section 105 thereof engages the arm 115 of clamp 113 causing it, by virtue of the action of spring 119, to swing over quickly until it rests against a stop 132 (FIGURE 2), thereby opening the clamp and releasing the joined together ends 65 of the tapes. The piece of sheet material being taped can then be taken away by lateral movement to one side, thus clearing the slot 6 of any obstruction which would impede return of the taping head 5 to the position shown in FIGURES 2 and 3, this return being facilitated by spring 126 about shaft 123. Upon return to the position shown in FIGURES 2 and 3, the joined together free ends 5 of the tapes 12, 13 re-enter the space between the clamp 113 and the anvil 114 following which, upon further return motion the trigger 117 on the housing of the upper tape supply source moves the arm 115 back to its original position (which the help of spring 119) so as to again close clamp 113 and grip securely the joined together ends 65 of the tapes 12, 13. The device has now been returned to the original condition and is ready for further taping operation.

What I claim as my invention is:

1. A device for applying a strip of adhesive tape to at least the upper surface of a piece of sheet material comprising: a body member; a generally U-shaped member having a taping head at the open end thereof and a shank portion arranged to have sliding engagement with the body member; said taping head having upper and lower tape applicator means yieldably urged together so as to form a bite at the entry faces thereof, said bite being located in the opening of the U-shaped member, and means for accommodating upper and lower tape supply sources whereby a strip of adhesive tape and a strip of control tape may be fed, respectively, with the adhesive surface of the adhesive tape facing the control tape, from said sources to said upper and lower applicator means, thence around the entry faces thereof, between the bite where the strips become joined together, and thence past the exit faces of the applicator means; means for moving said U-shaped member between a first position and a second position so as to effect a taping stroke; means for moving said U-shaped member from the second position to the first position so as to effect a return stroke; and clamping means attached to said body member, said clamping means adapted, when actuated, to grip the joined together strips of tape extending past the trailing faces of the tape applicator means whereby, during said taping stroke, the tapes are progressively withdrawn from said supply sources.

2. The device as claimed in claim 1 wherein the entry faces of the applicator means face the base of the U-shaped member.

3. The device as claimed in claim 1 wherein the exit faces of the applicator means face the base of the U-shaped member.

4. A device as claimed in claim 1 comprising tape shear means adapted, when the U-shaped member is in the second position, to sever the joined together tapes extending from the exit faces of the applicator means.

5. A device as claimed in claim 1 wherein the means for moving the U-shaped member from said first position to said second position comprises a shaft adapted to have sliding engagement with the body member, a handle attached to one end of the shaft, the other end of the shaft being connected to the U-shaped member.

6. A device as claimed in claim 5 wherein the means for moving the U-shaped member from the second position to the first position is a spring surrounding said shaft, said spring being compressed when the U-shaped member is in the second position.

References Cited in the file of this patent

UNITED STATES PATENTS

| | | |
|---|---|---|
| 852,761 | Bodine | May 7, 1907 |
| 2,171,259 | Scott | Aug. 29, 1939 |
| 2,606,136 | Garrett et al. | Aug. 5, 1952 |
| 2,745,464 | Auerbacher et al. | May 15, 1956 |
| 2,795,264 | Pechy | June 11, 1957 |
| 2,872,061 | Tostado | Feb. 3, 1959 |